United States Patent [19]

Hocker et al.

[11] Patent Number: 4,820,580

[45] Date of Patent: Apr. 11, 1989

[54] PROCESS FOR THE PRODUCTION OF A COMPOSITE SYSTEM OF A HIGHLY ELASTIC MATERIAL AND A POLYURETHANE FOAM LAYER AND PRODUCT FORMED THEREBY

[75] Inventors: Jürgen Hocker, Gladbach; Jürgen Faehndrich, Leverkusen, both of Fed. Rep. of Germany; Hans Hespe, Pittsburgh, Pa.; Kirkor Sirinyan, Gladbach; Dieter Wecker, Krefeld, both of Fed. Rep. of Germany

[73] Assignee: Bayer Aktiengesellschaft, Bayerwerk, Fed. Rep. of Germany

[21] Appl. No.: 180,509

[22] Filed: Apr. 12, 1988

[30] Foreign Application Priority Data

Apr. 17, 1987 [DE] Fed. Rep. of Germany ........ 3713178

[51] Int. Cl.$^4$ .......................... B32B 3/26; B32B 5/18; B05D 5/00; B29C 37/00
[52] U.S. Cl. .............................. 428/314.4; 156/629; 156/643; 156/646; 156/668; 156/79; 156/272.6; 156/278; 427/38; 427/244; 427/307; 427/322; 428/423.1
[58] Field of Search ............... 156/643, 646, 654, 668; 156/629, 633, 78, 79, 272.2, 272.6, 278; 204/192.36; 264/41, 45.1, 45.6, 51, 38, 39; 427/243, 244, 307, 322; 428/158, 160, 422.8, 423.1, 423.9, 314.4, 304.4, 424.2, 424.8

[56] References Cited

U.S. PATENT DOCUMENTS

4,263,408 4/1981 Meyborg et al. ..................... 521/51
4,563,086 1/1986 Knapp et al. ..................... 355/14 D
4,714,650 12/1987 Obayashi et al. ................... 428/268

FOREIGN PATENT DOCUMENTS

249198 12/1987 European Pat. Off. .
2617357 11/1976 Fed. Rep. of Germany .
3514864 7/1986 Fed. Rep. of Germany .
2053026 2/1981 United Kingdom .

OTHER PUBLICATIONS

Herman V. Boenig, Plasma Science and Technology, 1982.
M. Venugopalan et al., Plasma Chemistry III, Topics In Current Chemistry, 94, Springer Verlag, Berlin, 1980.
R. Weiner, Kunststoff-Galvanisierung, Electroplating Of Plastics, 1973.
M. Neusch and J. Kieser, Vacuum, vol. 34, 1984, pp. 959-961.
H. Yasuda, Plasma Polymerization, Academic Press, Inc., 1985.
Makromol. Chem., Macromol. symp. 5, pp. 237-244, 1986, by B. Jansen et al.
J. Macromol. Sci.-Chem., A17, pp. 217-226, 1982, L. H. Coopes et al., Gas Plasma Treatment of Polymer Surfaces.

*Primary Examiner*—William A. Powell
*Attorney, Agent, or Firm*—Gene Harsh; Joseph C. Gil; Lyndanne M. Whalen

[57] ABSTRACT

Composite materials are formed by subjecting a highly elastic material to a plasma treatment and then allowing a polyurethane foam forming mixture to foam on the plasma treated surface. These composites are particularly useful as shoe soles and as insulating materials.

9 Claims, No Drawings

PROCESS FOR THE PRODUCTION OF A COMPOSITE SYSTEM OF A HIGHLY ELASTIC MATERIAL AND A POLYURETHANE FOAM LAYER AND PRODUCT FORMED THEREBY

BACKGROUND OF THE INVENTION

The present invention relates to a process for the production of a composite of a highly elastic material and a foam.

The initiation of chemical reactions by plasmas has been known for some time. (See, for example, H.V. Boenig, Plasma Science and Technology, Carl Hanser Verlag, Munich/Vienna (1982). The interactions between plasmas and substrate surfaces are manifold and complex. Depending upon the gas used, the substrate surface may be cleaved or etched by reactive atoms, a technique widely used in semiconductor manufacture (See, for example, M. Verzugopalan et al : Plasma Chemistry III, Topics in Current Chemistry 94, Springer Verlag, Berlin (1980). It is known that intensive UV irradiation occurs in the plasma. In certain polymers, this unwanted UV radiation can lead to crosslinking reactions at or on the substrate surface. The higher the degree of crosslinking, the more sensitive a material is to UV radiation. It is also known that, due to the unsaturated —C=C-double bonds, highly elastic materials based on rubbers such as polybutadienes, polyisoprenes, etc., are more UV-sensitive than non-elastic polymers such as polyethylenes, polypropylenes and polyacrylonitriles.

It is also known that any increase in the degree of crosslinking and hence in the density of the polymer surface is accompanied by a reduction in the adhesion of coatings subsequently applied to that polymer.

The foaming of high-adhesion polyurethane coatings onto elastic shoe soles is a problem which has still not been solved.

To apply firmly adhering, foamed polyurethane layers, the rubber surface has hitherto had to be degreased and then subjected to wet-chemical etching with environment-polluting oxidizing agents. An adhesive layer which had to be activated by heat before application of polyurethane (PU) foam layer was then applied. Wet-chemical treatment of the rubber surface with oxidizing agents has the further disadvantage that it leads to the formation of cracks and vacuoles in the rubber surface which adversely affect the mechanical properties and long-term stability of the PU-to-rubber bond.

It is known from the literature that aqueous oxidizing agents used, for example, for the pretreatment of ABS (acrylonitrile, butadiene and styrene) copolymers corrode the elastic polybutadiene particles so that cavities and vacuoles are formed in the ABS surface. The coatings of metals or plastics applied in the second step are firmly anchored onto these vacuoles. In these systems, the adhesion obtained is explained by the pushbutton theory (See, for example, R. Weiner, Kunststoff-Galvanisierung, Eugen G. Leuze Verlag, Saulgau/Wurtt (1973).

The above-mentioned adhesion mechanism is also relevant to the adhesion of the polyurethane coatings to the pre-etched rubber surface. The vacuoles and cavities produced by wet-chemical etching have an average size of several $\mu m$ and may be observed by means of a scanning electron microscope (x200 magnification).

SUMMARY OF THE INVENTION

The object of the present invention is to apply a polyurethane foam layer firmly to the surface of a highly elastic material, for example to rubber soles, without the surface in question having to be etched or oxidatively roughened beforehand with the usual oxidizing liquids.

Surprisingly, this object is achieved by subjecting the surface of highly elastic materials to a plasma treatment and then foaming a polyurethane foam layer thereon.

DETAILED DESCRIPTION OF THE INVENTION

The present invention relates to a process for the production of a composite system of a highly elastic material and a polyurethane foam layer which is characterized in that the surface of the highly elastic material is subjected to a plasma treatment and a polyurethane foam layer is then foamed thereon. In one preferred embodiment of the invention, the surface of the highly elastic material is degreased with a non-etching solvent before the plasma treatment.

The plasma treatment is preferably carried out in a high-frequency plasma with microwaves or in a high-frequency plasma combined with magnetic field support. Preferred plasma gases are Ar, He, $O_2$, $O_3$, $N_2$, $SO_3$, $SO_2$, $CF_4$, $CF_2$=$CF_2$ and mixtures thereof.

The present invention also relates to composite systems of a highly elastic material and a polyurethane foam layer which may be obtained by the process of the present invention. The invention also relates to the use of these composite systems for the production of shoe soles and as insulating materials.

Surprisingly, the surface geometry of the plastic material is unaffected by the plasma treatment. Another surprising effect of the plasma treatment is that, despite the increase which it produces in the degree of crosslinking and hence in the density of the material surface, firm adhesion between the highly elastic material and the foam layer is obtained.

It has also surprisingly been found that a further improvement in adhesion can be obtained by pretreating the surface of the highly elastic material with polar or apolar solvents for 10 seconds to several minutes. Polar or apolar solvents which may be used for this purpose include non-etching liquids, such as water; alcohols, preferably ethanol, methanol and isopropanol; ketones, such as acetone and methylethylketone; chlorinated hydrocarbons, such as $CCl_2$=$CCl_2$, $CCl_4$, $CH_3$—$CCl_3$ and $CCl_2H$—$CCl_2H$; hydrocarbons, such as n-hexane, n-pentane, ligroin, petroleum ether and cleaning spirit; dimethylformamide; dimethylsulfoxide and mixtures thereof. Neutral, anionic and cationic surfactants and quaternary amines may be added to the solvents in quantities of from 0.1 to 5.0 wt. % to enhance their cleaning effect. Tetrabutylammonium bromide, dimethyl benzyl ammonium chloride, sodium benzenesulfonate and isononylphenol heptaglycol ether are all suitable for this purpose.

The process of the present invention has the following important advantages over the conventional pretreatment with oxidizing media: (1) the mechanical properties of the highly elastic material are not adversely affected by the plasma treatment; (2) the polyurethane foam layers applied by the process according to the invention have a bond strength according to DIN 53 273 of $\geq 20$ N/cm; (3) there are no wastewater problems, i.e. no risk of environmental pollution; and (4) the plasma treatment involves relatively little expense.

Methods for plasma treatment are known. Plasma treatment may be carried out with conventional plasma reactors such as for example HF (high-frequency) plasma in the frequency range from 27.12 to 13.56 MHz, with microwave plasma reactors in the frequency range of, for example, 2.45 GHz (see for example M. Neusch et al : Vacuum, 34, 959 (1984); H. Yasuda: Plasma Polymerisation, Academic Press, Inc. New York (1985); B. Jansen et al: Macromol. Chem., Macromol. Symp. 5 pages 237-244 (1986); I.H. Coopes et al: J. Macromol. Sci. -Chem., A 17(2), pages 217-226 (1982); EP-A No. 0249 198, EP-A No. 0179 636 and GB-A No. 2 053 026) and, in particular, with combined HF plasma/magnetic field systems.

The treatment times may be varied from 0.1 second to several minutes. Treatment times of 10 to 360 seconds are preferred and treatment times of 10 to 60 seconds are particularly preferred. The plasma treatment is generally carried out under a gas pressure of from 0.01 to 100 mbar and preferably of from 0.1 to 10 mbar.

The treatment temperature may be varied from room temperature to 160° C. Temperatures of from 30° C. to 60° C. are particularly preferred.

Both inert gases and reactive gases may be used to carry out the plasma reaction. Particularly suitable for the process of the present invention are $O_2$, $N_2$, He, Ar, $F_2$, $Cl_2$, $Br_2$, low molecular weight fluorocarbon compounds such as $C_2F_4$, $CF_4$, perfluoropropene and perfluorocyclohexane, alkenes (e.g. cyclohexene) and alkanes having up to 8 carbon atoms as well as $H_2S$, $SO_3$, $SO_2$, $NH_3$, $NO_2$; $N_2O_5$ and mixtures thereof.

Suitable highly elastic materials are any vulcanizable polymers or copolymers of olefinically unsaturated monomers in vulcanized form which generally have a glass transition temperature $T_G$ of from $-80°$ C. to $+40°$ C. and preferably from $-20°$ C. to $+10°$ C. These elastic materials are preferably nonporous, solid materials. In chemical terms, the highly elastic materials are preferably those based on polymers or copolymers of butadiene, isoprene, styrene, acrylonitrile, chloroprene, ethylene, propylene and/or norbornadiene. Particularly preferred highly elastic materials are those based on polybutadiene, polyisoprene, polychloroprene, styrene-butadiene and acrylonitrile-butadiene rubber. Vulcanized natural rubber is also suitable. It is also possible to use mixtures of the above-mentioned polymers or copolymers, optionally even with other polymers, such as polyamides, polyurethane, polyethers, polyesters, polyamidoimides, polystyrenes, polyethylenes, polyvinyl chloride and polypropylenes. These optional other polymers may be present in the rubber matrices in quantities of from 0.1 to 30 wt. %. Halogenated (fluorinated, brominated or chlorinated) derivatives of the above-mentioned rubbers may also be used.

Rubbers in which the matrices contain auxiliaries such as heat stabilizers, antiozonants, UV- and IR-stabilizers, radical acceptors, fungicides, organic and inorganic fillers (such as chalk, talcum, kaolin, and $Al_2O_3$), dyes, carbon blacks and pigments are also suitable for carrying out the process. Highly elastic materials vulcanized with standard auxiliaries are particularly suitable for carrying out the process of the present invention.

According to the invention, the following starting components may be used for the production of the polyurethane foam layer which is applied to the plasma treated elastic material: polyisocyanates, isocyanate reactive materials, catalysts, blowing agents and known additives and auxiliary agents.

Suitable polyisocyanates include aliphatic, cycloaliphatic, araliphatic, aromatic and heterocyclic polyisocyanates of the type described, for example, by W. Siefken in Justus Liebigs Annalen der Chemie, 362, pages 75-136. Examples of such polyisocyanates include those corresponding to the formula $$Q(NCO)_n$$

in which n represents 2 to 4, preferably 2 to 3, and

Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms or an araliphatic hydrocarbon radical containing from 8 to 15 (preferably from 8 to 13) carbon atoms.

Specific examples of such polyisocyanates are given in DE-OS No. 2,832,253, pages 10 to 11.

In general, it is particularly preferred to use polyisocyanates which are readily obtainable on industrial scale. Such readily available isocyanates include: 2,4- and 2,6-tolylene diisocyanate and mixtures of these isomers ("TDI"); polyphenyl-polymethylene polyisocyanates of the type obtained by phosgenation of aniline-formaldehyde condensates ("crude MDI"); and polyisocyanates containing carbodiimide groups, urethane groups, allophanate groups, isocyanurate groups, urea groups or biuret groups ("modified polyisocyanates"). Modified polyisocyanates of the type derived from 2,4 and/or 2,6-tolylene diisocyanate or from 4,4'- and/or 2,4'-diphenyl methane diisocyanate are especially preferred.

Compounds containing at least two isocyanatereactive hydrogen atoms and having a molecular weight of generally from 400 to 10,000 are also employed in producing the foams used in the present invention. In addition to compounds containing amino groups, thiol groups or carboxyl groups, compounds containing hydroxyl groups (preferred), particularly compounds containing from 2 to 8 hydroxyl groups having molecular weights of 1000 to 6000, preferably from 2000 to 6000 such as polyesters, polyethers, polythioethers, polyacetals, polycarbonates and polyester amides containing at least 2, generally from 2 to 8, but preferably from 2 to 6 hydroxyl groups, of the type known for the production of homogeneous and cellular polyurethanes and described, for example, in DE-OS No. 2,832,253, pages 11-18 are generally used.

Compounds containing at least two isocyanate reactive hydrogen atoms and having a molecular weight of from 32 to 399 may also be employed. These compounds may contain hydroxyl groups and/or amino groups and/or thiol groups and/or carboxyl groups, preferably compounds containing hydroxyl groups and-/or amino groups and serve as chain-extending agents or crosslinking agents. These compounds generally contain from 2 to 8, preferably from 2 to 4 isocyanate-reactive hydrogen atoms. Examples of such compounds can be found in DE-OS No. 2,832,253, pages 19-20.

Water and/or readily volatile organic compounds may be used as blowing agents.

Known auxiliaries and additives such as catalysts, surface-active additives (e.g. emulsifiers and foam stabilizers), reaction retarders (for example, acid-reacting substances, such as hydrochloric acid or organic acid halides), cell regulators such as paraffins or fatty alcohols or dimethyl polysiloxanes, pigments or dyes, flameproofing agents (for example, trischloroethyl phosphate and tricresyl phosphate), stabilizers against the effects of ageing and weather, plasticizers, fungistatic and bacteriostatic agents and also fillers (e.g. barium sulfate, kieselguhr, carbon black or whiting) may also be employed. These optional auxiliaries and additives are described, for example, in DE-OS No. 2,732,292, pages 21-24.

Further examples of surface-active additives and foam stabilizers, cell regulators, reaction retarders, stabilizers, flameproofing agents, plasticizers, dyes, fillers, fungistatic and bacteriostatic agents which may optionally be used in accordance with the invention and information on the way in which these additives are used and on their respective modes of action can be found in Kunststoff-Handbuch, Vol. VII, edited by Vieweg and Hochtlen, Carl-Hanser-Verlag, Munich 1966, for example on pages 103 to 113.

The foam layer(s) of the composite systems according to the invention is (are) preferably based on semi-rigid polyurethane foam(s) having a density in the range from 0.2 to 0.8 g/cm$^3$, preferably in the range from 0.3 to 0.5 g/cm$^3$, having a Shore A hardness of from 30 to 90, preferably from 40 to 60.

In general, the joining process by which the composite material is formed is carried out during the production of the polyurethane. The reaction components are reacted in known manner by the one-shot process, the prepolymer process or the semi-prepolymer process often using machines of the type described in U.S. Pat. No. 2,764,565. Particulars of processing machines which may be used in the practice of the present invention can be found in Kunststoff-Handbuch, Vol. VII, edited by Vieweg and Hochtlen, Carl-Hanser-Verlag, Munich 1966, for example on pages 121 to 205.

The polyurethane foam layer may be foamed under typical conditions, for example at temperatures between room temperature and 150° C. The working pressure may be varied between normal atmospheric pressure and 5 bar with pressures of from 0.7 to 1.5 bar being preferred.

Foamable polyurethane systems containing inorganic and organic fillers, such as $TiO_2$, kaolin, gypsum, talcum and chalk, pigments, dyes, PU catalysts, PU heat stabilizers and UV stabilizers and fungicides, may of course be used to carry out the process.

The thickness of the polyurethane layer may be varied between 1 and 50 mm, preferably between 2 and 20 mm depending upon the particular application. Films, sheets or moldings and profiles which can be passed continuously through the plasma are particularly suitable for the process of the present invention. However, batch operation is also possible.

The composite systems of the present invention may be used, for example, as shoe soles and insulating materials (for example, for sound insulation).

The invention is further illustrated but is not intended to be limited by the following examples in which all parts and percentages are by weight unless otherwise specified.

EXAMPLES

EXAMPLE 1

Standard commercially available rubber sheets (100×150×2 mm) of the STX 89 type made by the Metzeler Company of Munich, Federal Republic of Germany, based on a mixture of polybutadiene and natural rubber were cleaned with cleaning spirit and placed on the lower electrode of the HF plasma reactor. The plasma reactor was purged with technical argon, then evacuated to a press of ~0.6 mbar and the Ar plasma was struck. The working frequency of the plasma system was 27.12 MHz, the electrode temperature was ~30° C. and the output ~140 watts. The samples were removed from the reactor after a reaction time of approx. 45 seconds. A commercially available, foamable polyurethane reaction mixture which foamed to form 0.4 g/cm$^3$ density foam having a Shore A hardness of 50 was then directly applied to the samples without any wet-chemical etching treatment. The reaction mixture was a mixture of the polyol component and the polyisocyanate component described below.

Polyol component 88.7 parts by weight of a polyester polyol, molecular weight 2000, of adipic acid, ethylene glycol and 1,4-dihydroxybutane (molar ratio of the diols 70:30)
8.0 parts by weight ethylene glycol
0.5 part by weight water
0.5 part by weight triethylenediamine
0.55 part by weight of a commercial polysiloxane stabilizer (stabilizer DC 193, a product of Dow Corning).

Polyisocyanate component 90.0 parts by weight of an NCO prepolymer of 62 parts by weight 4,4'-diisocyanatodiphenylmethane and
38 parts by weight of the polyester diol used in the polyol component.

The polyurethane reaction mixture was applied in a quantity such that a 10 mm thick foam layer was formed.

A polyurethane/rubber composite system characterized by good adhesion was obtained. The adhesion of the urethane foam layer, as determined in accordance with DIN 53 357, measured approx. 35 N/cm.

EXAMPLE 2

Commercially available rubber sheets (100×150×2 mm) of the STY 80 type made by the Metzeler Company of Munich, Federal Republic of Germany, based on a mixture of polybutadiene, styrene-butadiene and natural rubber were cleaned with ligroin and then plasma-treated in the same way as in Example 1. The polyurethane foam layer mentioned in Example 1 was then foamed thereon in the same way.

A polyurethane/rubber composite system characterized by good adhesion was obtained. The adhesion of the polyurethane foam layer, as determined in accordance with DIN 53 357, measured approx 40 N/cm.

EXAMPLE 3

Commercially available rubber sheets of the same type as in Example 1 were cleaned with technical petroleum ether, plasma-treated under helium for 90 seconds in the same way as in Example 1 and then removed from the reactor. After storage for ~24 hours, the 10 mm thick polyurethane foam layer was foamed on using the commercially available, foamable polyurethane reaction mixture based on a conventional polyether based on propylene oxide having an average molecular weight of approx. 2000 and MDI described below. The foam had a density of 0.35 g/cm³ and a Shore A hardness of 50. The following reactive system was used to prepare the polyurethane foam:

Polyol component 56.3 parts by weight of a polyether polyol, OH number 28, prepared by propoxylation of propylene glycol and subsequent ethoxylation of the propoxylation product (ratio by weight PO:EO=70:30).

28.2 parts by weight of a polyether polyol, OH number 27, prepared by propoxylation of trimethylol propane and subsequent ethoxylation of the propoxylation product (ratio by weight PO:EO=78:22)

8.2 parts by weight ethylene glycol
3.3 parts by weight diethylene glycol
1.0 part by weight water
1.0 part by weight triethanolamine
0.4 part by weight triethylenediamine
0.3 part by weight of the siloxane stabilizer used in Example 1.

Polyisocyanate component 104 parts by weight of the NCO prepolymer described in Example 1.

A polyurethane/rubber composite system characterized by good adhesion of the polyurethane foam layer was obtained. The adhesion of the polyurethane foam layer, as determined in accordance with DIN 53,357, measured approx. 35 N/cm.

EXAMPLE 4

Commercially available rubber sheets (100×150×2 mm) of the BWN 7 type made by the Metzeler Company of Munich, Federal Republic of Germany, based on polybutadiene were pretreated with 1,1,2-trichloro-1,2,2trifluoroethane and then plasma-treated in accordance with Example 1 and provided with the polyurethane foam layer described in Example 1 using the same procedure.

A polyurethane/rubber composite system characterized by good adhesion was obtained. The adhesion of the foam layer, as determined in accordance with DIN 53 357, measured approx. 40 N/cm.

EXAMPLE 5

The rubber sheets plasma-treated in accordance with Example 4 were stored for approximately 24 hours and then provided as in Example 1 with the polyurethane foam layer described in Example 1.

A polyurethane/rubber composite system characterized by good adhesion was obtained. The adhesion of the polyurethane foam layer, as determined in accordance with DIN 53 357, measured approx. 35 N/cm.

EXAMPLE 6

Commercially available rubber sheets (100×150×2 mm) of the WC 51 type made by the Metzeler Company of Munich, Federal Republic of Germany, based on a mixture of styrene-butadiene rubber and polyisoprene rubber were cleaned with $CCl_2=CCl_2$ and then treated for 120 seconds with an oxygen plasma in accordance with Example 1, removed from the reactor and then provided as in Example 1 with the same polyurethane foam layer.

A polyurethane/rubber composite system characterized by good adhesion was obtained. The adhesion of the foam layer, as determined in accordance with DIN 53 357, measured approx. 35 N/cm.

EXAMPLE 7

Rubber sheets of the type described in Example 6 were cleaned with a mixture of ethanol and acetone, plasma-treated under oxygen for 90 seconds in the same way as in Example 1 and then provided as in Example 3 with the same polyurethane foam layer.

A polyurethane/rubber composite system characterized by good adhesion was obtained. The adhesion of the foam layer, as determined in accordance with DIN 53 357, measured approx. 35 N/cm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a composite system of a highly elastic material and a polyurethane foam layer in which the surface of the highly elastic material is subjected to a plasma treatment and a polyurethane foam layer is then foamed thereon.
2. The process of claim 1 in which the surface of the highly elastic material is degreased with a non-etching solvent before the plasma treatment.
3. The process of claim 1 in which the plasma treatment is carried out in a high-frequency plasma with microwaves or in a high frequency plasma supported by a magnetic field.
4. The process of claim 1 in which the highly elastic material used has a glass transition temperature $T_G$ of from $-80°$ C. to $+40°$ C. and the polyurethane foam layer is based on a polyurethane having a density of 0.2 to 0.8 g/cm³ and a Shore A hardness of from 30 to 90.
5. The process of claim 1 in which Ar, He, $O_2$, $O_3$, $N_2$, $SO_3$, $SO_2$, $CF_4$ or $CF_2=CF_2$ or a mixture thereof is used as the plasma gas.
6. A composite of a highly elastic material and a polyurethane foam layer produced by the process of claim 1.
7. A composite of a highly elastic material and a polyurethane layer produced by the process of claim 4.
8. A shoe sole formed from the composite of claim 6.
9. A shoe sole formed from the composite of claim 7.

* * * * *